United States Patent [19]

Golder

[11] 4,292,957
[45] Oct. 6, 1981

[54] SOLAR OVEN

[76] Inventor: John C. Golder, P.O. Box 854, Santa Cruz, Calif. 95061

[21] Appl. No.: 96,820

[22] Filed: Nov. 23, 1979

[51] Int. Cl.³ .............................................. F24J 3/02
[52] U.S. Cl. ................................................ 126/451
[58] Field of Search ...................................... 126/451

[56]  References Cited
U.S. PATENT DOCUMENTS

| 3,106,201 | 10/1963 | Steinberg ........................ | 126/451 |
| 4,130,106 | 12/1978 | Clevett et al. .................. | 126/451 |
| 4,220,141 | 9/1980 | Way ................................. | 126/451 |
| 4,257,404 | 3/1981 | Steinberg ........................ | 126/451 |

Primary Examiner—Carroll B. Dority, Jr.
Attorney, Agent, or Firm—Robert G. Slick

[57] ABSTRACT

A portable, foldable solar oven is provided wherein the basic construction material is ordinary cardboard, some surfaces of which are coated with a reflective material. The portable oven doubles as an insulated container for keeping refrigerated foodstuffs cold while being transported to a distant site for cooking.

6 Claims, 4 Drawing Figures

SOLAR OVEN

SUMMARY OF THE INVENTION

The present invention relates to a portable solar oven which is basically constructed of cardboard and accordingly is inexpensive.

The inner surfaces of the cardboard are rendered reflective, preferably by placing a metalized plastic over the surface of the cardboard, such as aluminized Mylar. Alternatively, a metal foil can be used for the reflective surface.

In accordance with the present invention, the oven is light-weight and inexpensive to construct. It is easily portable and contains a rigid heat-insulating material to conserve the heat when it is used as an oven and which is preferably faced with a smooth surface so that it is very easy to clean. The oven folds to a compact package and the insulating material of the oven doubles as the insulation of a refrigerator so that foods can be transported to a picnic site or the like. Thus, the oven will keep the food cold until it is desired to heat the food at which time the oven is unfolded and the sun will heat and/or cook the food.

One object of the present invention is to provide a solar oven having a removable nonbreakable double glazing unit wherein the glazing consists of a heat-resistant plastic which is easily and cheaply replaced and which can be lifted off to provide a simple means of access to the oven interior.

Another object of the present invention is to provide a solar oven with a simple means wherein the food box remains level, but wherein the reflective panels are easily adjusted to the correct altitude for the sun.

The whole oven can be easily rotated to provide for the correct azimuth and an indicator is provided which has the dual function of allowing one to position the reflectors to an optimum elevation angle and to rotate the oven to the correct azimuth for maximum heating.

The oven of the present invention folds into an extremely compact unit for easy transportation and storage.

Other features and objects of the invention will be apparent from the balance of the specification.

DESCRIPTION OF THE PREFERRED EMBODIMENTS

Figure 1:
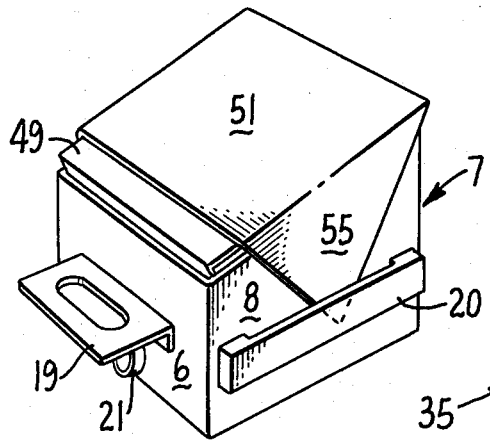
FIG. 1 is a perspective view of an oven embodying the present invention.
Figure 2:
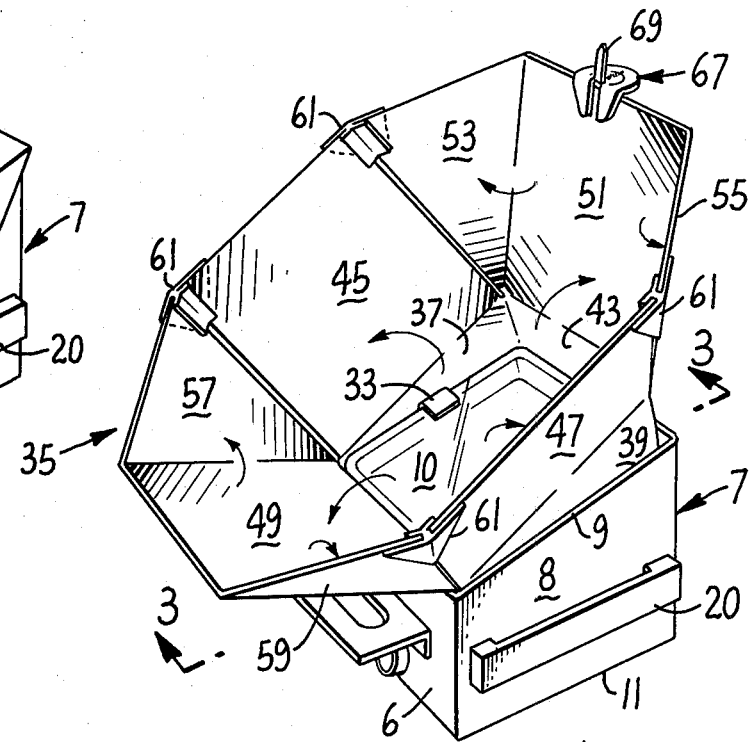
FIG. 2 is a view of the oven showing the flaps open in order to catch the sun for a heating or cooking operation.
Figure 4:
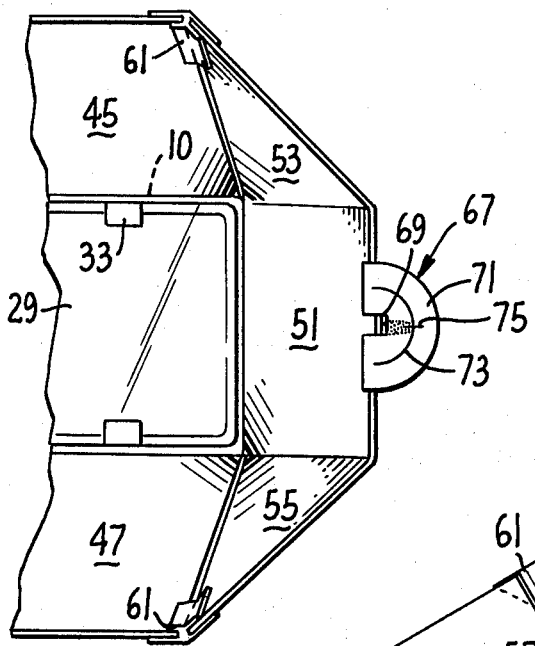
FIG. 4 is a partial plan view of the open oven.

Referring now to the drawings by reference characters, there is shown an oven having a base box of generally rectangular structure, generally designated 7, having a front wall 6, sides 8 and 10, a back wall 12 and a bottom 11. The walls can be referred to as the south, east, west and north walls, respectively, since in the nothern hemisphere these are the general directions these walls would face near midday. The top edges of the east and west walls of the box, the east one of which has been designated 9, make an angle of roughly 17° to the bottom 11 of the box. As will be later explained in detail, it has been found that 17° is about optimum for locations having the latitude of the United States, but, of course, the optimum angle will depend on the area to be served. The 17° angle enables the reflector assembly to have enough base member length at the rear (N) to allow the reflector assembly to extend to a position that will effectively utilize sunlight from 90° to 30° altitude (altitude of most useful hours for persons living in the 30°–40° latitudes). By placing wall 12 on the ground (11 then becoming the back N wall and 12 the bottom) and moving gnomon 67 to the top of 49, the sun's rays may be effectively utilized from 60° to 0°, i.e., from sunrise to sunset. Resting inside the base member 7 is rigid insulating material forming the front 13, the bottom 15 and back 17. Side insulating panels are also employed but are not numbered. The tops of the front and back panels are beveled as at 14 and 18 to form a tight air seal with the glazing. Preferably, there is a black paint and foil facing on the insulation. It will be noted that the back panel 17 does not fit tightly against the back 12 of the base box 7, the reason for which will be explained shortly. Box 7 is provided with a handle 19 for easy portability and has side retainers 20 to hold ends 53 and 55 as is later explained. If desired, a thermometer 21 can be provided which extends through the insulating panel 13 into the center 23 of the oven.

At the top of the insulating panels is a double glazed heat-retaining member, designated 25. This consists of a frame 27 of generally rectangular structure so that it will rest onto the insulating members; the front and back surfaces 29 and 31 are composed of replaceable layers of a heat-resistant transparent plastic. These plastic sheets may be held in place by any suitable means and can be easily lifted by Tab 33. Thus, a very inexpensive double glazed structure is provided. Also, should any moisture condense on the inner surface, as might well happen when the box has been utilized as a refrigerator, it is only necessary to invert the member 25 to cause the moisture to evaporate rapidly. The glazing may be in the form of a plastic envelope having a closed end 30 and the open end may be sealed with tape, not shown.

The reflector element, generally designated 35, has a base which consists of the joined side members 37 and 39, the front member 41 and the back member 43. Thus, the base resembles a box without a bottom. Extending upward from the sides are the main reflective elements, namely 45 extending upwardly from 37; 47 extending upwardly from 39; 49 extending upwardly from 41 and 51 extending upwardly from 43. Each of these is of generally rectangular configuration and, assuming the base of the box 7 is square, these members would also be appropriately square. These elements extend from a base line 65, although as a practical manner the fold line of each reflector is offset from the next so that they can be folded down in overlying relationship. In addition, four triangular reflective elements are provided, namely 53 and 55 extending from 51, and 57 and 59 extending from 49. The inner surfaces of these elements, namely 45, 47, 49, 51, 53, 55, 57 and 59, are provided with a reflective coating. One way of accomplishing this would be to provide an inner coating of a metal foil such as aluminum. However, it is preferred that the inner surface of each of these reflective elements be provided with a thin film of a metalized plastic such as aluminized Mylar. The metal surface, of course, would be next to the cardboard flaps so that the metal surface would be protected from scratching and oxidation.

In order to hold the reflectors at the proper angle, metal or plastic clips or extrusions are provided at each of the junctions such as the metal clip 61 at the junction of the solar panels 45 and 53.

Figure 3:
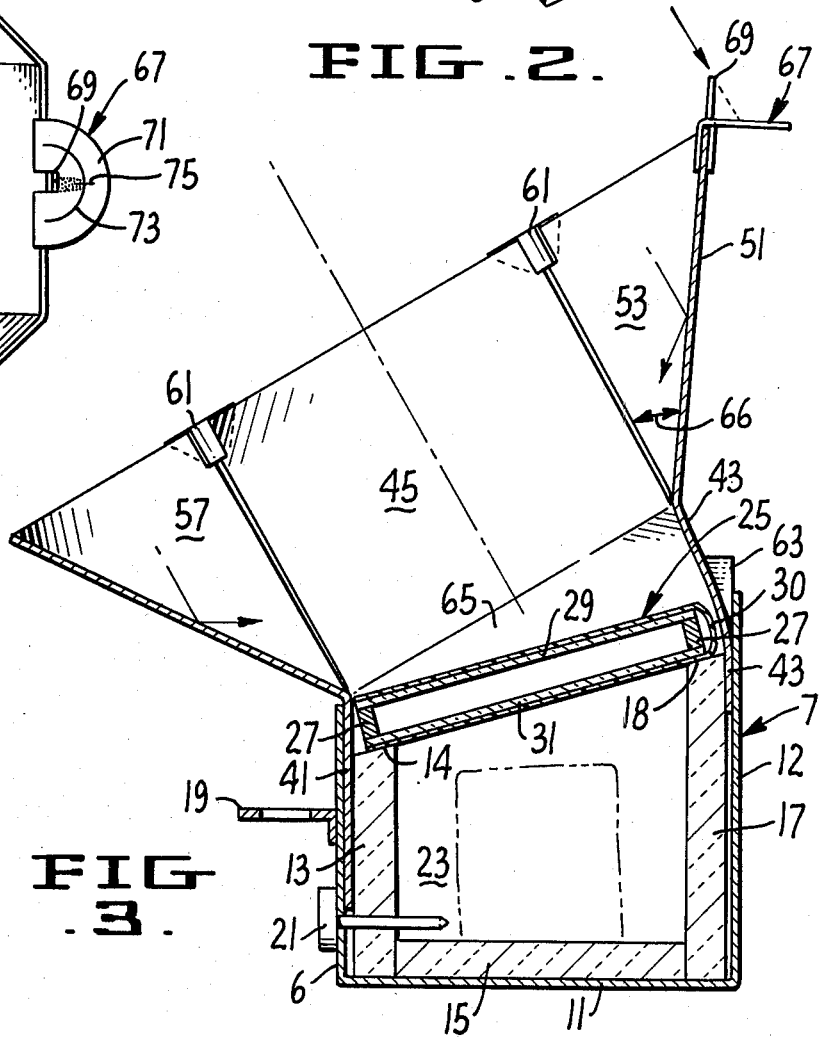
FIG. 3 is a section on the line 3—3 of FIG. 2.

As is best seen in FIG. 3, the base members of the reflective element tuck between the base box and the insulating material so that the front of the base 41 tucks between the insulating block 13 and the front wall, while the rear element bends around and 43 tucks between the insulating block 17 and the back wall. Similarly, sides 37 and 39 tuck between the sides of the box and the sides of the insulating block of the oven. This provides a substantial amount of friction so that the entire reflective assembly 35 can be tilted to a desired elevation and will more or less stay in place. If it is desired to have a more secure means of holding the reflector to the correct elevation angle in which case a small wedge 63 can be used between the flap 31 and the back wall. In using such an oven, it is obvious that to secure optimum results the base of the reflective element 65 should be maintained with both elevation and aximuth so that the sun strikes the center of the reflective elements at an angle of about 90° with respect to base line 65. Further, in order to secure optimum effective reflection, it has been found that the reflective flaps should make an angle of about 120° to the plane of 65 when 65 is perpendicular to the path of the sun. Thus, the angle 66 should ideally be about 30°.

In order to secure optimum utilization of the sun's energy, the indicator 67 is provided. Indicator 67 is formed to clip onto a flap such as 51 and has a gnomon 69 which casts a shadow on an indicating surface 71. The indicating surface 71 is parallel to the base line 65 and is provided with an arc 73 and a central line 75. With this indicator, one first corrects the elevation of the oven by sliding the flap 43 in and out until the shadow of the tip of the gnomon 69 falls on the arc 73. At this point, the elevation may be locked in place utilizing the wedge 63. Now one rotates the box around to secure the correct azimuth, i.e. wherein the shadow of the pointer of the gnomon 69 falls on the line 75. Of course, during the course of the cooking, it is advantageous to correct the position of the reflection from time to time to agree with the changing position of the sun.

The spatial (geometric) relationship of 69, 71 and 75 is such that when 69 is clipped to the top edge of either 49 or 65, the shadow of 69 will touch both 73 and 75 when 65 is perpendicular to the sun's rays (position for optimum reflection of sunlight into oven interior).

The oven of the present invention is very portable and also lends itself for service as an insulated container as was previously mentioned. When one wishes to disassemble the oven, the clips 61 and the indicator 69 are merely slid off of the flaps and can be placed in the bottom of the oven. Now one folds the flaps 47 and 45 down ovr the glazing element 25 and pulls the flap 49 down towards the glazing element, engaging the triangular members 57 and 59 between the sides 37 and 39 and the sides of the box 7. Now one folds flap 51 down and tucks the flaps 53 and 55 into the side retainers 20. Thus, the structure is folded compactly for carrying by the handle 19. It should be noted that by placing the thermometer 21 in the same side of the box structure as is the handle, there will be no tendency for the thermometer to fall out as the oven is being transported.

Although certain specific elements have been set forth in the specification, it should be understood that these are for purposes of illustration only and that many variations can be made in the exact structure shown without departing from the spirit of this invention.

I claim:

1. A portable foldable solar oven comprising in combination:
   a. a base consisting primarily of a box-like member having four sides and a bottom and an open top;
   b. insulating means within said box lining all four sides and the bottom of said box and forming the interior surfaces of the oven;
   c. a glazing element supported over the top of said insulating material and
   d. a generally funnel-shaped reflective element supported over said glazing element, said reflective element having downward extending flaps, said flaps extending between the sides of said box and said insulating material whereby friction between said flaps and said box holds said reflective member at a desired elevation angle.

2. The oven of claim 1 wherein the reflective element consists of four rectangular panels with triangular panels bridging the space between adjacent rectangular panels, two of said rectangular panels being hinged to each of the front and back rectangular panels.

3. The oven of claim 1 wherein the flaps can be slid up and down with respect to said base to make a desired elevation angle and having a wedge to lock the reflective element in place.

4. The oven of claim 1 having an indicator consisting of a clip to hold the indicator on one of the reflector panels and a flat surface with an upstanding gnomon and having indicia whereby the shadow of the gnomon indicates both the optimum elevation and azimuth of the reflector.

5. The oven of claim 1 wherein the glazing element consists of a spacer fitting over the insulating means and having a replaceable, heat-resisting, transparent plastic on each side thereof.

6. The oven of claim 2 having retainers on each side of the box-like member whereby the oven can be folded for transportation by placing two opposed triangular panels between the box and the insulating material and the other two triangular panels in said retainers.

* * * * *